United States Patent [11] 3,617,239

| [72] | Inventors | Andrew J. Klanica<br>Cheshire;<br>Henry W. Schiessl, Northford, both of<br>Conn. |
|---|---|---|
| [21] | Appl. No. | 803,997 |
| [22] | Filed | Mar. 3, 1969 |
| [45] | Patented | Nov. 2, 1971 |
| [73] | Assignee | Olin Mathieson Chemical Corporation |

[54] METHOD FOR PRODUCING MICRONUTRIENT COATED UREA PRILLS AND PRODUCTS
5 Claims, No Drawings

[52] U.S. Cl. ...................................................... 71/28,
  71/64 E, 260/555 C
[51] Int. Cl. ...................................................... C05c 9/00
[50] Field of Search ........................................... 71/64 E, 28;
  260/555 C

[56] References Cited
UNITED STATES PATENTS
3,070,435 12/1962 Reusser et al. ................ 71/64 E
3,071,457 1/1963 Murray ........................... 71/59 X
3,180,735 4/1965 Titus ............................. 99/2
3,388,989 6/1968 Sor ............................... 71/28

OTHER REFERENCES
Handbook of Chemistry and Physics, 48th edition, 1967— pages B-175, B-185, C-589- Published by The Chemical Rubber Co.- Copy in Group 173 (QD 65 C4 1967 c.2).

*Primary Examiner*—Samih N. Zaharna
*Assistant Examiner*—Bennett H. Levenson
*Attorneys*—Gordon D. Byrkit, Walter D. Hunter, Donald F. Clements, Ellen P. Trevors, Richard S. Strickler, Robert H. Bachman, Donald R. Motsko and Thomas P. O'Day ABSTRACT: Urea prills are reacted with finely divided minor amounts of water-soluble inorganic hydrated salts of micronutrient fertilizer elements and dried to produce a chemically integral coating of urea-micronutrient salt complex which provides micronutrients and anticaking properties to the urea prills.

METHOD FOR PRODUCING MICRONUTRIENT COATED UREA PRILLS AND PRODUCTS

Urea, generally in the form of prills, is sold and used as a fertilizer. Since urea is a relatively soft, hygroscopic material, these prills tend to agglomerate and cake upon prolonged standing. Even when protected by multi-layered bags, this undesirable caking occurs under the normal stacking conditions of warehouse storage.

The reason for prilling the urea in the first place is to provide a free-flowing product which can be spread on the land with distributing machines normally in use on farms. The subsequent caking, therefore, defeats the initial purpose of prilling and is a serious disadvantage in the use of the urea prills since clusters of prills cannot be spread evenly on the land.

To alleviate the problem of caking and to maintain a free-flowing product, various coating agents have been used commercially, including clays and diatomaceous earth. The efficacy of such coatings varies considerably with the type of material used and has been generally less than satisfactory. The use of such coatings causes an additional expense, which is uncompensated by any other utility than a somewhat less than satisfactory reduction in the caking tendency.

Conventional fertilizers are generally mixtures of compounds containing nitrogen, phosphorus and potassium, the so-called "macronutrients." Therefore, they lack the elements generally referred to as "micronutrients," except as adventitious impurities of unknown and uncontrolled concentration. These "micronutrients" are defined in Department of Agriculture 1957 yearbook, "Soil," at page 80, as iron, manganese, zinc, copper, molybdenum, boron and chlorine. Since most soils are deficient in one or more of these micronutrients, these elements have been incorporated into ordinary fertilizers either by admixing compounds of the micronutrient elements with the fertilizer particles or by coating the fertilizer particles with such compounds. The latter procedure serves the additional purpose of providing an anticaking coating on the particles when suitable coating agents are chosen which impart this property of anticaking. Broadly speaking, the oxides of the micronutrient elements provide this additional property.

Since micronutrients are required in minor amounts and, furthermore, since many of these nutrients are phytotoxic in excessive amounts, it is imperative that the nutrients be distributed uniformly on the land and in known nonphytatoxic amounts and controllable concentrations. Prior art methods of coating the fertilizer particles with finely divided micronutrient compounds by solely physical means has not resulted in a coating which adheres tenaciously enough to resist segregation in normal handling due to differences in particle size and density. When oxides of micronutrient elements are used, there is the additional disadvantage that they are insoluble in water and, therefore, very slowly if at all available to plants. For purposes of treating micronutrient deficiencies in the soil, it is desirable to provide the nutrients in quickly and readily available form.

U.S. Pat. No. 3,180,735 discloses animal feed supplements which are mechanical mixtures containing preformed urea-metal salt complexes with or without additional urea and grain among other ingredients. That patent does not teach any particular mode of formation of the metal salt complexes and does not teach any process of forming urea prills having a chemically bound, tightly adherent coating of a micronutrient salt-urea complex on urea prills.

The present invention provides a process for coating micronutrient compounds on the surface of urea prills which eliminates the inherent disadvantages of the prior art. The novel process produces anticaking, tightly adhering, uniform coatings on urea prills of micronutrient compounds which are readily soluble in water. This improved result is obtained by chemically bonding the micronutrient compounds with urea. They become integral chemical parts of the urea and cannot be dislodged. The micronutrient coating is not only chemically bonded to the urea surface but it is also uniformly distributed. The result of these advantageous properties is that the micronutrient elements do not segregate and can therefore be uniformly applied to the soil.

The chemical bonding of micronutrient elements to urea surfaces is achieved by applying a superficial layer of finely divided hydrated salts of the micronutrient elements to form a prill wetted by the water of hydration displaced from the hydrated salt by urea which forms the corresponding urea complex of the micronutrient salt. The so-wetted prill is dried to remove the water.

The existence of urea complexes of numerous metal salts is well known and their preparation from solution phase has been described in the literature. The facile exchange of urea for the water of hydration of salts of micronutrient elements in a solid-solid reaction is surprising, particularly when one considers the high stability of the hydrated salts and that in aqueous solutions the reverse reaction occurs, that is urea complexes lose urea with the preferential formation of hydrated complexes. The process of the present invention is further surprising in that the corresponding anhydrous salts do not complex with urea in a solid-solid reaction.

In contrast with predictions based on the prior art, the hydrated sulfates, nitrates and chlorides and other hydrated salts of micronutrient elements react in the dry state with solid urea even at ambient temperatures. This reaction is rapid and the water of hydration is displaced by the equivalent moles of urea. The liberated water can then be removed by suitable means, for example, by vacuum and/or heat to yield uniformly coated, free-flowing urea prills. The coating is chemically bonded to the urea prill surface and this coating is not easily dislodged. This novel method for coating urea prills provides advantageous means for incorporating trace elements with major plant nutrients where the trace element is chemically bonded to the urea prill surface. A further advantage of this invention is that the treated urea prills have an anticaking coating.

Suitable hydrated salts for use according to the present invention are water-soluble inorganic hydrated salts of micronutrient fertilizer elements, for example, iron, manganese, molybdenum, boron, copper, zinc and chlorine. Suitable salts contain the micronutrient element in either the anion or cation. For example, some of the metals are suitably used as their sulfates, nitrates, or chlorides while others are supplied suitably as salts of anions containing the micronutrient elements, for example, molybdates or borates.

However, it is important that the micronutrient salts are hydrated salts rather than anhydrous salts since the latter do not appear to react in the dry state with urea as the hydrated salts do. Mixtures of hydrated salts are advantageous to provide several micronutrient elements. In another advantageous mode of practicing the invention, where several elements are provided, urea prills are separately coated with a single micronutrient and the various prills are blended in any desired proportion, to provide a composition supplying the micronutrient elements in specified proportion to each other and to the urea nitrogen for application to a particular deficient area.

The amount of hydrated salt used suitably ranges from 0.01 percent to 10 percent by weight based on the urea depending on the final composition desired to provide appropriate amounts of the micronutrient element.

The hydrated salts are preferably finely divided and on tumbling or otherwise mixing with urea prills react to form the metal salt-urea complex and to liberate the hydrate water. The resulting wetted prill is uniformly coated with the micronutrient salt-urea complex.

Drying the wetted urea prill removes the liberated water of hydration and provides the urea prill having a uniform coating of the micronutrient salt-urea complex. The temperature and pressure of drying can be varied within wide limits. It is generally advantageous to maintain the temperature of the coated prill below about 130° C. to avoid decomposition. Preferably, the temperatures are maintained below 100° C.

and are appropriately above about 20° C. to maintain a reasonably rapid rate of drying. Using a stream of hot, inert gas as drying agent at atmospheric pressure, for example, the time of contact should be controlled to maintain the temperature of the coated prill below 130° C. and preferably below 100° C. Using vacuum drying, pressures under about 100 mm. Hg. provide rapid drying in the temperature range of 20° to 100° C., preferably about 50° to 80° C. Other methods of drying the wetted prills are also suitable.

The urea prills used in the following examples generally showed 95 percent passing 6 mesh and 80 percent or better retained in 20 mesh U.S. Standard Screens.

EXAMPLE I

Coating Urea With Anhydrous $CuSO_4$

A mixture of 22.7 g. of anhydrous $CuSO_4$ passing 200 mesh U.S. Standard sieves and 454 g. of urea prills was tumbled for 15 minutes at 25° C. The powered $CuSO_4$ coated the urea prill surface with a white or very light brown color. This is the color of anhydrous copper sulfate and not the blue color of copper sulfate pentahydrate or of the urea complex, indicating no complex formation.

These coated prills were placed on a 70 mesh U.S. Standard sieve and vigorously shaken for 60 seconds. 46.3 percent of the anhydrous copper sulfate was shaken loose from the urea prills and passed through the 70 mesh screen. X-ray analysis of the loose powder confirmed that this powder was anhydrous copper sulfate.

This experiment shows that a complex does not form when anhydrous $CuSO_4$ is coated on dry urea prills. A physical coating of anhydrous $CuSO_4$ on the urea prills is formed and this coating is easily dislodged.

Reaction of Powdered $CuSO_4 \cdot 5H_2O$ and Urea Prills

A mixture of 11.4 g. of powdered $CuSO_4 \cdot 5H_2O$ passing 200 mesh U.S. Standard sieves and 227 g. urea prills was tumbled at 67°–70° C. for 20 minutes at 25 mm. Hg. pressure. The urea prills were immediately coated with the powdered $CuSO_4 \cdot 5H_2O$ and the mixture became wetted due to the displacement of water of hydration by urea. The liberated water of hydration was pumped through a trap cooled to −78° C., collected and weighed. The 3.8 g. of water collected amounted to 4/5 of the theoretical amount liberated in the formation of $CuSO_4 \cdot 5CO(NH_2)_2$. These prills were free-flowing, light blue colored, uniformly coated and the coating could not be dislodged by vibration on a sieve shaker for 60 seconds.

Preparation of $CuSO_4 \cdot 5CO(NH_2)_2$

A mixture of 4.54 g. of powdered $CuSO_4 \cdot 5H_2O$ and 5.45 g. of dry urea having a molar ratio of 1 mole of $CuSO_4 \cdot 5H_2O$ to 5 moles of urea was pulverized at 25° C. The mixture immediately became wet due to the liberated water of hydration. This mixture was then dried in a vacuum over at 25 mm. Hg. and 60° C. for 1 hour. The dry pale blue powder was analyzed by X-ray powder pattern. This analysis confirmed the absence of urea, $CuSO_4$, and hydrates of $CuSO_4$. This pale blue powder was then analyzed for elemental composition.

| Theoretical for $CuSO_4 \cdot 5CO(NH_2)_2$ Element | Wt. % | Found Wt. % |
|---|---|---|
| Cu | 13.82 | 13.50 |
| C | 13.06 | 13.04 |
| N | 30.46 | 30.14 |
| H | 4.35 | 4.59 |
| S | 6.97 | 6.78 |
| O | 31.34 | 31.95 by difference |
| | 100.00 | 100.00 |

The X-ray pattern was identical with one obtained using the coated prills prepared in example I.B. confirming the formation on the prills of a chemically bonded coating which is comprised of $CuSO_4 \cdot 5CO(NH_2)_2$. These coated prills are uniformly coated, free-flowing, and the coating adheres tenaciously to the urea prill surface.

EXAMPLE II

Reaction of $FeSO_4 \cdot 7H_2O$ and Urea Prills

A mixture of 22.7 g. of dry powdered $FeSO_4 \cdot 7H_2O$ passing 200 mesh U.S. Standard sieves and 454 g. of urea prills was tumbled for 5 minutes at 25° C. The urea prills were immediately coated by the powdered $FeSO_4 \cdot 7H_2O$ and wetted due to the displacement of the water of hydration by urea. These wetted and uniformly coated prills were dried in a vacuum oven for about 2 hours at 60° C. and 25 mm. Hg. The theoretical amount of 10.3 grams of water, due to formation of $FeSO_4 \cdot 7CO(NH_2)_2$, was recovered by drying the wet prills.

These dry urea prills, coated with a film of $FeSO_4 \cdot 7CO(NH_2)_2$, were light brown in color, free-flowing and the coating adhered to the urea prill surface very tenaciously. The composition of the coating was found by X-ray analysis to be $FeSO_4 \cdot 7CO(NH_2)_2$.

Preparation of $FeSO_4 \cdot 7CO(NH_2)_2$

In a separate experiment the compound $FeSO_4 \cdot 7CO(NH_2)_2$ was prepared by reacting 5 grams of $FeSO_4 \cdot 7H_2O$ with 7.55 grams of urea. The reactants were pulverized in the dry state. The pulverized mixture immediately became wet due to displacement of the water of hydration by urea. This wet homogeneous brown material was then dried in a vacuum oven at 60° C. and 25 mm. Hg. for 3.5 hours. X-ray analysis showed the complete absence of urea, $FeSO_4$, or any hydrate of $FeSO_4$. The X-ray powder pattern lines were identical to the powder pattern lines of the urea prill coating described above. This light brown dry powder was prepared specifically to provide a standard for comparison of X-ray data. The composition of this $FeSO_4 \cdot 7CO(NH_2)_2$ complex was further confirmed by elemental analysis.

| Theoretical for $FeSO_4 \cdot 7CO(NH_2)_2$ Element | Wt. % | Found Wt. % |
|---|---|---|
| Fe | 9.76 | 9.30 |
| N | 34.27 | 33.22 |
| S | 5.60 | 5.27 |
| C | 14.67 | 14.50 |
| H | 4.93 | 5.24 |
| O | 30.76 | 32.47 by difference |
| | 99.99 | 100.00 |

EXAMPLE III

Reaction of $MnCl_2 \cdot 4H_2O$ With Urea Prills

A mixture of 11.4 g. of powdered $MnCl_2 \cdot 4H_2O$ passing 200 mesh U.S. Standard sieves and 227 g. of urea prills was tumbled for 2 hours at 25° C. and 25 mm. Hg. The liberated water was continuously removed as it was displaced by urea and was pumped through a trap cooled to −78° C., collected and weighed. The 3.9 g. of water collected indicates that essentially all of the water of hydration was liberated and replaced by 4 moles of urea. The coated prills were free-flowing, pale pink in color and the urea prill coating adhered to the surface of the urea prills very tenaciously.

Preparation of $MnCl_2 \cdot 4CO(NH_2)_2$

A mixture of 11.4 g. of $MnCl_2 \cdot 4H_2O$ and 13.82 g. of urea was pulverized. The mixture became wet immediately due to the liberation of the water of hydration. This pale pink homogeneous wet composition was dried in a vacuum over at 60° C. and 25 mm. Hg. for 16 hours. The theoretical 4.2 grams of water formed by complete reaction was collected. The dry pale pink powder was analyzed by X-ray powder pattern. There was no evidence for the presence of urea, $MnCl_2$ or any hydrate of $MnCl_2$. The X-ray powder pattern showed the presence of a new unidentified compound. This compound was confirmed by elemental analysis to be $MnCl_2 \cdot 4CO(NH_2)_2$.

| Theoretical for $MnCl_2 \cdot 4CO(NH_2)_2$ Element | Wt. % | Found Wt. % |
|---|---|---|

| | | |
|---|---|---|
| Mn | 15.00 | 14.07 |
| Cl | 19.37 | 19.81 |
| C | 13.13 | 13.09 |
| H | 4.41 | 4.57 |
| N | 30.60 | 30.52 |
| O | 17.49 | 17.94 by difference |
| | 100.00 | 100.00 |

EXAMPLE IV

Reaction of $(NH_4)_6Mo_7O_{24} \cdot 4H_2O$ and Urea

A mixture of 11.4 g. of powdered $(NH_4)_6Mo_7O_{24} \cdot 4H_2O$ passing 200 mesh U.S. Standard sieves and 227 g. of urea prills was tumbled at 68° C. and 25 mm. Hg. for 15 minutes. The liberated water of hydration was pumped through a trap cooled to −78° C., collected and weighed. 0.6 grams of water was collected compared to the theoretical amount of 0.66 g.

The coated prills were free-flowing, white, and uniformly coated and the coating adhered very tenaciously to the urea prill surfaces. X-ray analysis of the urea prill coating confirmed that the coating consisted of $(NH_4)_6Mo_7O_{24} \cdot 4CO(NH_2)_2$.

Preparation of $(NH_4)_6Mo_7O_{24} \cdot 4CO(NH_2)_2$

A mixture of 11.4 g. of $(NH_4)_6Mo_7O_{24} \cdot 4H_2O$ and 2.21 g. of urea was pulverized and then dried in a vacuum oven at 60° C. and 25 mm. Hg. for 16 hours. The dry white powder was analyzed by X-ray powder data. This analysis showed the complete absence of urea, $(NH_4)_6Mo_7O_{24} \cdot 4H_2O$ or any other hydrate of $(NH_4)_6Mo_7O_{24}$. The composition of this compound was also confirmed by elemental analysis.

| Theoretical for $(NH_4)_6Mo_7O_{24} \cdot 4CO(NH_2)_2$ Element | Wt. % | Found Wt. % |
|---|---|---|
| Mo | 47.83 | 45.97 |
| N | 13.96 | 13.61 |
| C | 3.42 | 3.56 |
| H | 2.87 | 3.03 |
| O | 31.91 | 33.83 by difference |
| | 99.99 | 100.00 |

EXAMPLE V

Reaction of $ZnSO_4 \cdot 7H_2O$ and Urea Prills

A mixture of 22.7 g. of powdered $ZnSO_4 \cdot 7H_2O$ passing 200 mesh U.S. Standard sieves and 454.0 g. of urea prills was tumbled at 30° C. for 10 minutes. The urea prills were immediately coated with the $ZnSO_4 \cdot 7H_2O$ and a reaction occurred whereby the water of hydration was liberated and a urea-$ZnSO_4$ complex formed and the prills became wet. These uniformly coated wet prills were dried in a vacuum oven at 60° C. and 25 mm. Hg. for 4 hours. During this drying, 9.4 g. of water was removed from the wet prills compared with the theoretical amount of 9.95 g.

The dry urea prills were free-flowing, white and uniformly coated. This coating adhered to the urea prills very tenaciously. The urea prill coating was identified by X-ray analysis as $ZnSO_4 \cdot 7CO(NH_2)_2$.

Preparation of $ZnSO_4 \cdot 7CO(NH_2)_2$

A mixture of 6.84 g. of $ZnSO_4 \cdot 7H_2O$ and 9.99 g. of urea was pulverized. The reactants immediately became wet due to the liberated water of hydration. This wet product was dried in a vacuum oven at 60° C. and 25 mm. Hg. for 16 hours. X-ray analysis of the dry white powder showed the presence of strong lines identical to the lines of the coated urea prills above. The composition of this new compound was confirmed by elemental analysis.

| Theoretical for $ZnSO_4 \cdot 7CO(NH_2)_2$ Element | Wt. % | Found Wt. % |
|---|---|---|
| n | 11.24 | 11.21 |
| S | 5.51 | 5.38 |
| C | 14.44 | 14.45 |
| H | 4.85 | 5.04 |
| N | 33.70 | 33.64 |
| O | 30.26 | 30.28 by difference |
| | 100.00 | 100.00 |

EXAMPLE VI

Reaction of $MnSO_4 \cdot H_2O$ and Urea Prills

A mixture of 22.7 g. of powdered $MnSO_4 \cdot H_2O$ passing 200 mesh U.S. Standard sieves and 454.0 g. of urea prills was tumbled at 30° C. for 10 minutes. The urea prills were immediately coated with $MnSO_4 \cdot H_2O$ and a reaction occurred whereby the water of hydration was liberated and a urea-$MnSO_4$ complex formed and the prills became wet. The uniformly coated wet prills were dried in a vacuum oven at 60° C. and 25 mm. Hg. for 4 hours.

The dry urea prills were free-flowing, white and uniformly coated. This coating adhered to the urea prills very tenaciously.

We claim:

1. Method of producing urea prills coated chemically with an adduct of urea and a metal salt of a micronutrient fertilizer element comprising finely dividing a water-soluble inorganic hydrated salt of said micronutrient element, mixing, and thereby reacting in the dry state, urea prills with a nonphytotoxic amount of said salt within the range of 0.01 percent to 10 percent by weight based on the urea, said reaction displacing the water of hydration by the equivalent moles of urea to form said adduct uniformly distributed on and chemically bonded to said prills, wetted by the liberated water, and drying said prills at a temperature below 130° C.

2. Method as claimed in claim 1 in which the micronutrient element of said hydrated salt is selected from the group consisting or iron, manganese, molybdenum, copper, zinc and chlorine.

3. Method as claimed in claim 1 in which said drying is conducted at a temperature below 130° C. under a pressure below 100 mm. Hg.

4. Method as claimed in claim 3 in which said drying is conducted at from 20° to 100° C. under a pressure under about 100 mm. Hg.

5. Coated urea prills prepared by the method of claim 1.

* * * * *